United States Patent [19]
Horiuchi

[11] Patent Number: 5,872,683
[45] Date of Patent: Feb. 16, 1999

[54] FLOATING TYPE OF MAGNETIC HEAD

[75] Inventor: Toshihiro Horiuchi, Shizuoka-ken, Japan

[73] Assignee: Minebea Co., Ltd., Miyota-Cho, Japan

[21] Appl. No.: 783,329

[22] Filed: Jan. 15, 1997

[30] Foreign Application Priority Data

Jan. 29, 1996 [JP] Japan ................................. 8-34383

[51] Int. Cl.⁶ .............................. G11B 5/60; G11B 15/64
[52] U.S. Cl. ........................................................ 360/103
[58] Field of Search ............................................. 360/103

[56] References Cited

U.S. PATENT DOCUMENTS

| | | | |
|---|---|---|---|
| 4,870,520 | 9/1989 | Shaw | 360/103 |
| 5,255,139 | 10/1993 | Von Huene et al. | 360/103 |

FOREIGN PATENT DOCUMENTS

| | | |
|---|---|---|
| 5-101362 | 4/1993 | Japan . |
| 5-101363 | 4/1993 | Japan . |
| 6-282812 | 10/1994 | Japan . |
| 9-54931 | 2/1997 | Japan . |

*Primary Examiner*—William J. Klimowicz
*Attorney, Agent, or Firm*—Oliff & Berridge, PLC

[57] ABSTRACT

A floating type of magnetic head is provided for carrying out a winding work without bending a lead line to enhance the working efficiency and for avoiding any damage of lead line. A cutaway which is in communication with a groove and extends toward a leading side is formed on a trailing side of a first slider body. Since a bottom of the groove is retreated toward the leading side, the lead line is advanced to the trailing side and drawn out of the trailing side without bending while winding process. Since the lead line is drawn out to the first rail side, the lead line may be folded back to the trailing side hole and the hollow portion, and may be drawn out of the hollow portion under the straight condition without bending the lead line. The lead line is not necessary to be bent. The working efficiency may be enhanced. It is possible to restrain the generation of twists or kinks and to avoid any fear of a breakdown or a damage of the lead line.

6 Claims, 5 Drawing Sheets

F I G . 9
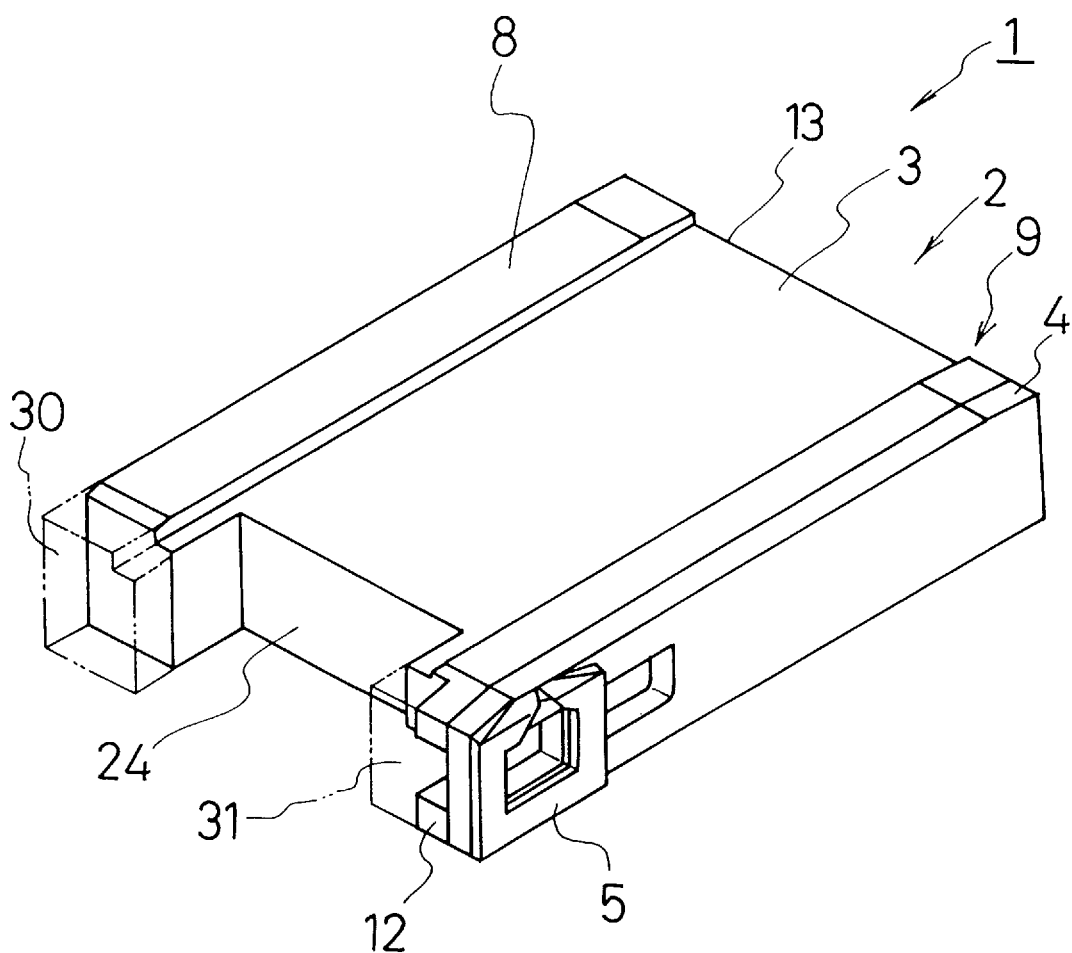

ND OF THE INVENTION

The present invention relates to a floating type of magnetic head, and more particularly to a composite type of magnetic head which is used for rigid disk drive.

For instance, Japanese Patent Application No. Hei 7-224775 discloses a conventional floating type of magnetic head as shown in FIGS. 10 and 11. The floating type of magnetic head 1 is mainly composed of a first slider body 3 and a second slider body 4 which are made of non-magnetic material such as ceramics and bonded together for forming a slider 2, a magnetic head core 5 bonded to the second slider body 4, and coils 7A and 7B formed by winding lead lines 6 around a part of the second slider body 4 and the magnetic head core 5.

A first rail (one rail) 8 and one part 9a of a second rail (the other rail) 9 of a pair of first and second rails are formed on one surface (which is a surface facing a magnetic recording medium (not shown) and which is on the upper side in FIG. 11) of the first slider body 3, and a groove (for use of winding lead lines) 10 which extends in the longitudinal direction of the first slider body 3 is formed on the side of the first slider body 3.

The second slider body 4 is in the form of a plate and bonded to the first slider body 3 so as to cover the groove 10. Two rectangular holes 15 and 16 are formed on one side (one side being referred to as a trailing side 12 and the other side being referred to as a leading side 13) to cover the groove 10 while leaving a plate-like edge portion 14. The hole 15 on the trailing side 12 and the hole 16 on the leading side 13 will hereinafter be referred to as a trailing side hole 15 and a leading side hole 16 respectively. A plate-like bridge portion 17 is formed in parallel with the edge portion 14 at a portion between the trailing side hole 15 and the leading side hole 16.

The second rail 9 is formed by combining one surface (the side facing the magnetic recording medium and the upper side in FIG. 11) of the second slider body 4 with one part 9a of the second rail 9.

The magnetic head core 5 is provided with a pair of C shaped first and second core bodies 20 and 21, each of which has a leg portion (hereinafter referred to as first and second leg portion 18 and 19) in such a manner as each leg portion contacts at the ends to form an annular shape. A magnetic gap 22 for recording/reproducing is formed at the contacted portion on one side of the magnetic head core 5. The magnetic head core 5 is bonded on the side 4a of the second slider body 4 while aligning the first and second leg portions 18 and 19 with the edge portion 14 and the bridge portion 17 respectively. Coils 7A and 7B are formed by winding lead lines 6 around the edge portion 14 and the first leg portion 18, and around the bridge portion 17 and the second leg portion 19 respectively. The two coils 7A and 7B are connected with each other in such a manner as external magnetic fields are canceled by so-called balance winding.

In the floating type of magnetic head 1, since the slider 2 is provided with the second slider body 4 so as to cover the groove 10 of the first slider body 3, the reduction of strength due to the formation of the groove 10 can be compensated by bonding of the second slider body 4 to enhance the strength of the slider 2. And by increasing the bonded area of the magnetic head core 5, the bonding strength can be enhanced, eventually, the damages and the like of the slider 2 and the magnetic head core 5 can be restrained.

By the way, in the conventional technique shown in FIGS. 10 and 11, when the lead line 6 is wound around the bridge portion 17 and the second leg portion 19 to form the coil 7B, as shown in FIG. 11, the lead line 6 is inserted through the leading side hole 16, and drawn out along a wall 23 of the groove 10 from the trailing side 12 to the outside. Next, the lead line 6 is folded back and inserted into the groove 10. Then, the lead line 6 is caused to pass through the trailing side hole 15 and drawn out outside. The lead line 6 is further folded back and inserted into the leading side hole 16. These operations are repeated to form the coil 7B having a predetermined number of turns around the bridge portion 17 and the second leg portion 19.

Then, after the lead line 6 is folded back, when the lead line 6 is inserted from the trailing side 12, the lead line 6 is inserted in parallel with the longitudinal direction of the groove 10. It is therefore difficult to insert the lead line 6 into the trailing side hole 15. In order to solve this difficulty, the lead line 6 needs to be bent. However, since such a process of bending the lead line 6 is carried out, the working efficiency has been low. Also, the bending the lead line 6 would cause the lead line 6 to be twisted or kinked and would cause a winding to be expanded, resulting in a breakdown of the lead line 6.

SUMMARY OF THE INVENTION

In order to overcome the above-noted defects, an object of the invention is to provide a floating type of magnetic head for carrying out a winding work without bending the lead line to improve the workability and avoid any damage of the lead line, when forming a coil by winding the lead line.

According to one aspect of the invention, there is provided a floating type of magnetic head characterized in that a slider having a pair of rails for generating an aviation force on a magnetic recording medium is composed of a first slider body in a rectangular shape, which constitutes one rail and a part of the other rail of said pair of rails on one surface and has a groove extending in the longitudinal direction on the side of the other rail, and a second slider body which is bonded to the first slider body so as to cover the groove, has two holes through the groove while leaving plate-like edge portion at one side and has one surface to be aligned with a part of the other rail to form the other rail; a magnetic head core having an annular shape has first and second leg portions facing with each other at their tip ends; the magnetic head core is bonded to the side of the second slider body by aligning respectively the first and second leg portions with the edge portion and the bridge portion formed between said two holes; a cutaway which is in communication with the groove and extends toward one rail side and the other side of the first slider body is formed at the one side of the first slider body and between the pair of rails; and lead lines are wound around the edge portion and the first leg portion and around the bridge portion and the second legportion, respectively, to form coils.

With such a structure, the cutaway is in communication with the groove made in such a manner as it extends toward the other side of the first slider body so that the bottom of the groove is disappeared in the cutaway. And since the cutaway is disposed on the first rail side, a space for drawing out the lead line is secured at the first rail side.

The cutaway may be in the form of a substantially rectangular shape in plan view.

Also, the cutaway may be formed in such a manner as it becomes narrowed stepwise toward the other side of said first slider body.

Also, the cutaway may be narrowed in the form of a V-shape in plan view toward the other side of the first slider body.

Also, the cutaway may be narrowed in the form of a trapezoidal shape in plan view toward the other side of the first slider body.

Further, an additional cutaway adjacent to said cutaway may be formed either at the side of the first or second rail at one side of the first slider body.

BRIEF DESCRIPTION OF THE DRAWINGS

FIG. 9 is a plan view showing the floating type of magnetic head, in which the said additional cutaway is provided either on the first rail side or on the second rail side;

DESCRIPTION OF THE PREFERRED EMBODIMENTS

Figure 10:
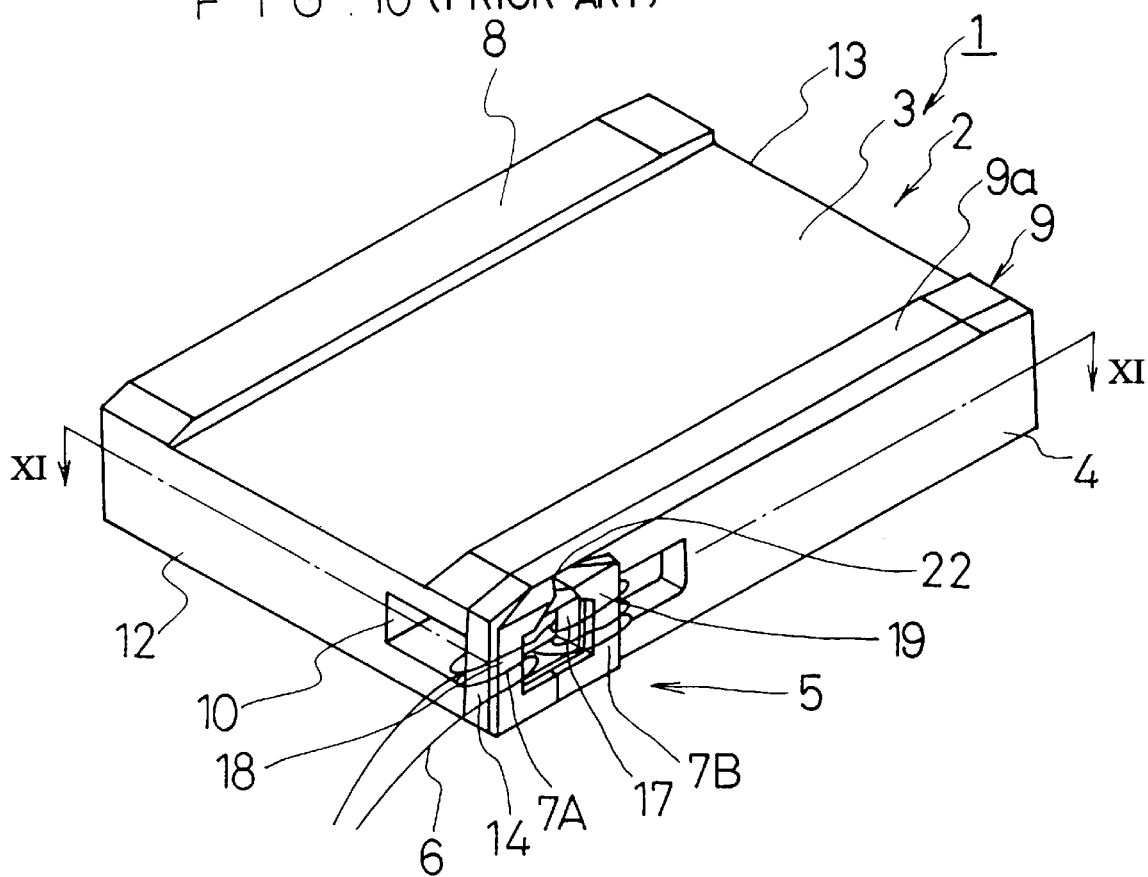
FIG. 10 is a perspective view showing a conventional floating type of magnetic head.
Figure 11:
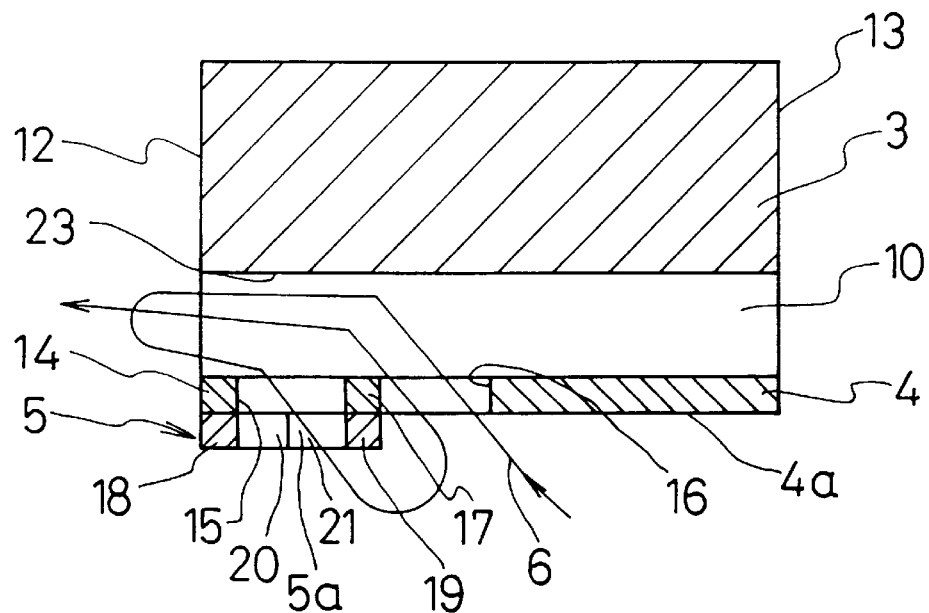
FIG. 11 is a cross-sectional view taken along the line B—B of FIG. 10.

The present invention will now be described in more detail with reference to FIGS. 1 and 2 by way of example of a floating type of magnetic head. As to the reference numerals which are used to indicate same members or components to ones used in FIGS. 10 and 11, repeated explanation will be avoided in the following description.

As shown in Figures, a cutaway 24 which is in communication with the groove 10 and extends toward the leading side 13 is formed on the trailing side 12 of the first slider body 3 between the first rail 8 and the second rail 9.

The cutaway 24 is in the form of a substantially rectangular shape in plan view. A side surface 25 being close to the first rail 8 and side surface 26 being close to the second rail 9 which passes over the wall 23 of the groove 10. The side 26 passes over the wall 23 of the groove 10 to reach to the vicinity of the second rail 9 so that a portion, on the trailing side 12, of the wall 23 of the groove 10 has been removed, and an end 28 on the trailing side 12 of the wall 23 of the groove 10 is formed as a portion of the groove extending toward the leading side 13.

The floating type of magnetic head 1 is produced as follows. Namely, thick and thin plate-like, first and second slider blanks made of non-magnetic material for the first and second slider bodies 3 and 4 are prepared. A plurality of grooves 10 are formed in parallel with each other on one surface of the first slider blank, and a polishing process is applied to one surface of the first and second slider blanks until a mirror-surface condition is obtained.

In a next step, a glass film having a predetermined thickness is formed by a sputtering technique on the polished surfaces of the first and second slider blanks.

Subsequently, the first and second slider blanks are attached with each other and bonded together by applying heat treatment under a given force applied thereto.

Next, a pair of first and second holes are formed on the end portion of the second slider body 4 to be bonded the first slider body 3 and to correspond to the groove 10 at a given interval by the laser beam treatment. Further, said pair is formed in plural. The first and second holes are made so as to be the trailing side hole 15 and the leading side hole 16 shown in FIG. 2.

Figure 4:
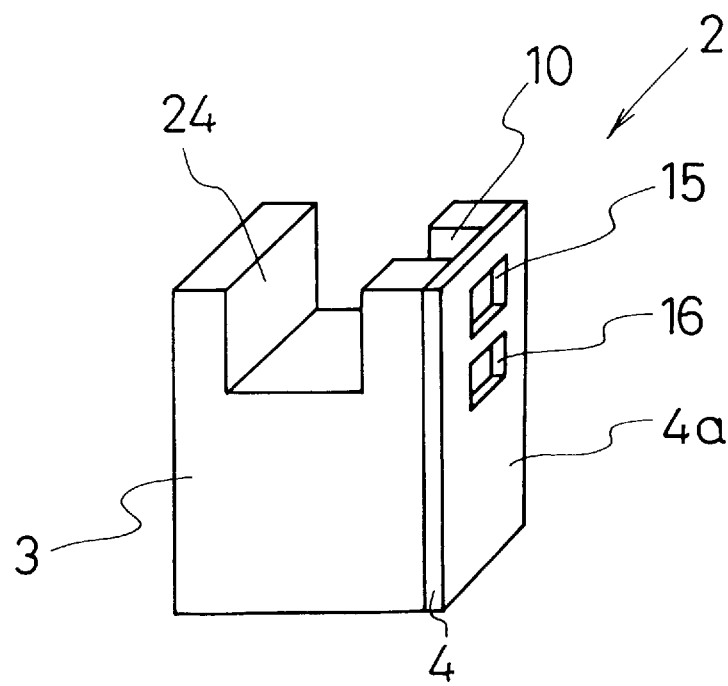
FIG. 4 is a perspective view showing a machining process of a cutaway to the slider.

The first and second slider bodies 3 and 4 are bonded, and the slider 2 thus manufactured as proposed in Japanese Patent Application No. Hei 7-224775 filed in the name of the present applicant, is positioned in tools (not shown) for machining process to form the cutaway 24 as shown in FIG. 4. Subsequently, the polishing process is applied to the side 4a of the second slider body 4 until it becomes a mirror-surface and the side 4a is ready to be bonded with the magnetic head core 5.

The magnetic head core 5 is bonded to the slider 2 (the side 4a of the second slider body 4). Thereafter, the lead lines 6 are wound around the edge portion 14 and the first leg portion 18 and around the bridge portion 17 and the second leg portion 19 to form so-called balance winding type coils 7A and 7B and a floating type of magnetic head 1 is obtained.

Figure 2:
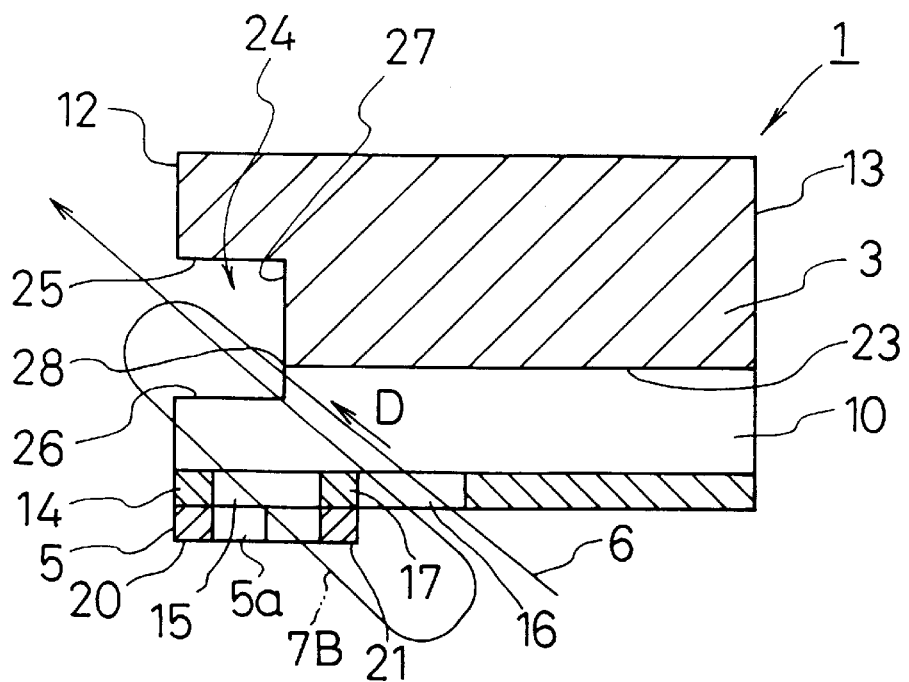
FIG. 2 is a cross-sectional view taken along the line A—A of FIG. 1.
Figure 3:
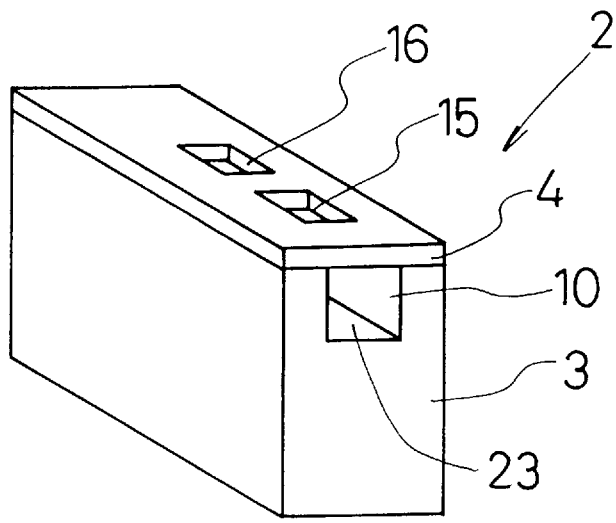
FIG. 3 is a perspective view showing a manufacturing process for the floating type of magnetic head, in which a slider is composed of the first and second slider bodies.

In the above-described floating type of magnetic head 1, when the lead line 6 is wound around the bridge portion 17 and the second leg portion 19 to form the coil 7B, as shown in FIG. 2, the lead line 6 is inserted from the leading side hole 16 and drawn out of the trailing side 12 through the groove 10 and the cutaway 24. The end 28 of the wall 23 is retreated toward the leading side 13, so that, the lead line 6 is prevented from getting in touch with the wall 23 of the groove 10 and the lead line 6 is can be advanced up to in a direction indicated by the arrow D without any bending.

Furthermore, by forming the side surface 25 of the cutaway in the vicinity of the first rail 8, the lead line 6 may be advanced in the same direction (in the direction indicated by the arrow D) without a touching the side surface 25. The lead line 6 is advanced in the same direction (in the direction indicated by the arrow D) and drawn out of the trailing side 12. Due to this constitution, it is possible to fold back directly the lead line 6 so as to be directed to a hollow portion 5a of the magnetic head core 5 and the trailing side hole 15. By thus folding back the lead line 6 toward the trailing side hole 15, the line drawing-out work may be carried out by advancing the lead line 6 directly in a reverse direction to the insertion direction of the lead line 6 (in the direction indicated by the arrow D), and the lead line 6 can be drawn out through the hollow portion 5a of the magnetic head core 5 and the trailing side hole 15. Accordingly, it is unnecessary to bend the lead line 6 and while winding the working efficiency is increased.

Furthermore, by forming the coil 7B in the above-described manner, there is no fear that any twist or kink would be generated. The breakdown of the coil 7B which would take place if twists or kinks are generated may be avoided.

In the embodiment, the slider 2 is constituted by bonding the second slider body 4 to the first slider body 3 so as to cover the groove 10. In the same manner as the above-described conventional technique, the side of the first slider body 3 is well reinforced. As a result, the strength of the slider 2 is also enhanced. The damage or breakdown of the slider 2 and the magnetic head core 5 to be bonded to the slider 2 may be securely avoided during assembling, processing and the like. Also, in the same manner as conventional technique, since the strength of the slider 2 is increased, it is possible to restrain the deformation of the slider 2 thereby to keep the good floating characteristics.

In the foregoing embodiment, the cutaway 24 is formed a substantially rectangular in plan view. However, instead thereof, cutaways may be formed as shown in FIGS. 5, 6, 7 and 8 like 24A, 24B, 24C and 24D respectively.

Figure 1:
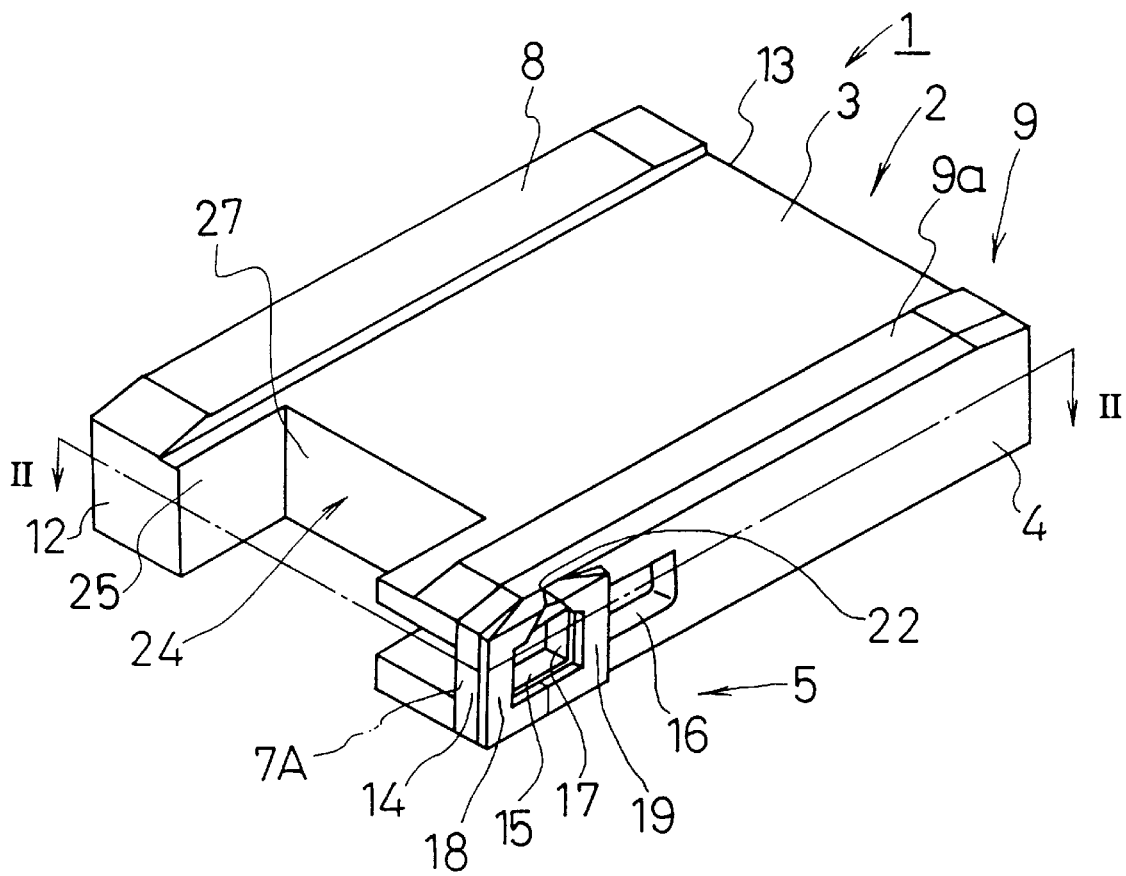
FIG. 1 is a perspective view showing a floating type of magnetic head in accordance with an embodiment of the present invention.
Figure 5:
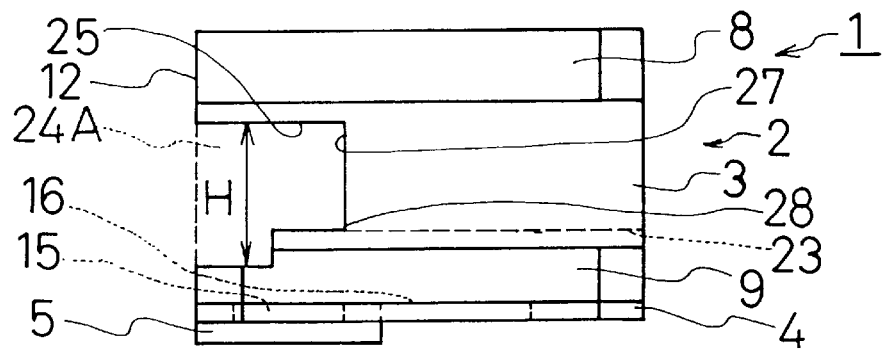
FIG. 5 is a plan view showing the floating type of magnetic head, in which the cutaway is formed stepwise in a plan view.

In FIG. 5, since the cutaway 24A is formed in such a manner as said cutaway 24A is cut further compared to an amount of cutting of the cutaway 24 shown in FIGS. 1 and 2, the end 28 of the wall 23 of the cutaway 24A is more retreated toward the leading side 13. However, from the view point of strength, the cutaway of the slider body 4 is shallow, so that the bottom is stepped, and the insertion direction of the lead line 6 is caused to be guided close to the end 28 of the wall 23, therefore, a degree of freedom for the insertion is increased.

Figure 6:
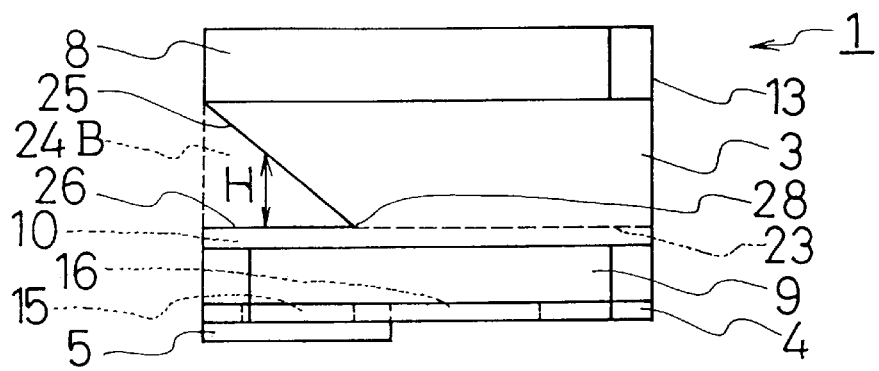
FIG. 6 is a plan view showing the floating type of magnetic head, in which the cutaway is V-shaped in a plan view.

The cutaway 24B shown in FIG. 6 is in the form of a V-shape in which the width H becomes smaller toward the leading side 13 in plan view. In this case, the side surface 26 is in parallel with the second rail 9 and is formed in the vicinity of the second rail 9 beyond the wall 23 of the groove 10. Also, the side surface 25 is slanted relative to the second rail 9 to extend to the leading side hole 16. With the floating type of magnetic head 1, it is possible to carry out the winding work without bending the lead line 6 in the same manner as in the floating type of magnetic head 1 shown in FIGS. 1 and 2. Also, since the side surface 25 is slanted relative to the second rail 9, an amount of cutting may be reduced to be advantageous to the strength.

Figure 7:
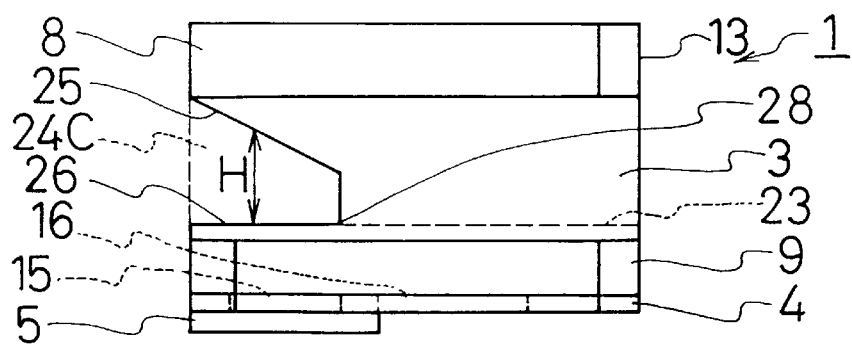
FIG. 7 is a plan view showing the floating type of magnetic head, in which the cutaway is a trapezoid in a plan view.

The cutaway 24C shown in FIG. 7 is in the form of a trapezoid where the width H becomes smaller toward the leading side 13 in plan view. In this case, the side surface 26 is in parallel with the second rail 9 and is formed in the vicinity of the second rail 9 beyond the wall 23 of the groove 10. Also, the side surface 25 is slanted relative to the first rail 8 to extend to the leading side hole 16. With the floating type of magnetic head 1, in the same manner as in the floating type of magnetic head 1 shown in FIG. 6, an amount of cutting may be reduced.

Figure 8:
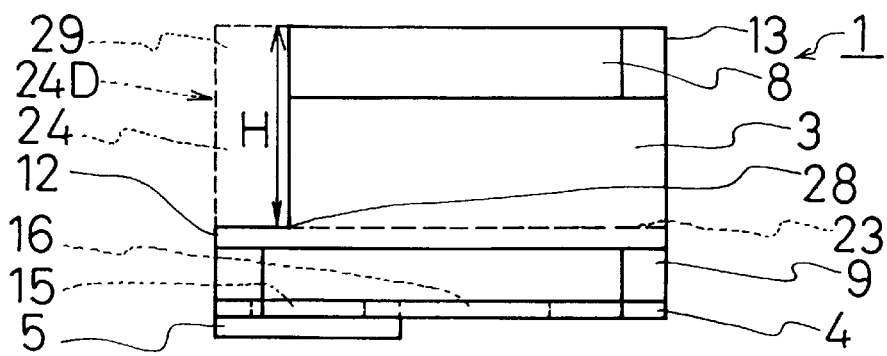
FIG. 8 is a plan view showing the floating type of magnetic head, in which said cutaway contains the trailing side of the first slider body.

The cutaway 24D of FIG. 8 is formed by adding an additional cutaway 29 adjacent to the cutaway 24 of FIG. 1 and FIG. 2, in which the additional cutaway corresponds to a portion on the trailing side 12 of the first rail 8.

In this floating type of magnetic head 1, since the lead line 6 is inserted and drawn out in parallel with the trailing side hole 15, compared with the cutaway configuration of FIGS. 1–7, the working efficiency for winding coil is increased.

In either of the floating type of magnetic head 1 having the cutaway (24A, 24B, 24C, 24D) shown in any of FIGS. 5 through 8, also as well as in the floating type of magnetic head 1 shown in FIGS. 1 and 2, the insertion of the lead line 6 is facilitated to enhance the working efficiency. Also, it is possible to prevent the damage of the coil 7B because there is no formation of twists or kinks of the lead line 6.

In any of the floating type of magnetic head 1 shown in any of FIGS. 1, 2 or 5 through 7, for example, as shown in FIG. 9, it is possible to form an additional cutaway 30 in the first rail side adjacent to the cutaway 24 by removing a corresponding portion, on the trailing side 12 of the first rail 8. Also, it is possible to form an additional cutaway 31 in the second rail side adjacent to the cutaway 24 by removing the portion, on the trailing side 12 of the second rail 9. Also, it is possible to form an additional cutaway 31 adjacent to the cutaway 24 in the second rail side by removing the portion, on the trailing side 12 of the second rail 9 shown in FIG. 8. In this case, it is necessary to avoid a deformation of a winding of the lead line 6 due to an expansion of said winding which may be generated by increasing the winding turns of the lead line 6.

By being constituted as described above, the cutaway 30 and the cutaway 31 are formed so that a weight balance of the first and second rails 8 and 9 becomes unstable. However the amount of the cutaway 30 and the cutaway 31 are ignorable, respectively. Accordingly, there is no fear of imbalance in weight and no adverse effect against the floating characteristics.

According to the present invention, the end portion, on the other side of the bottom, of the groove is formed as a portion of the groove portion extending toward the leading side. Accordingly, the lead line may be advanced toward one side of the first slider body and drawn out from said one side under the condition that the lead line is straightened without any contact with the bottom of the groove. Also, the end, on the first rail side, of the cutaway is disposed at the first rail side, and the lead line is drawn out on the first rail side. Therefore, it is possible to fold back the lead line toward the hole on the one side and the magnetic head core and to draw the lead line out of the hollow portion of the magnetic head core under the straight condition without bending the lead line. Thus, the lead line has no need to be bent and the working efficiency may be enhanced.

Furthermore, the coil is formed by winding the lead line without bending the lead line, so that the breakdown of the coil which would happen in the case where twists or kinks are generated may be prevented.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A floating type of magnetic head comprising:
   a slider having a pair of rails for generating a floating force on a magnetic recording medium composed of a first slider body in a substantially rectangular shape, which constitutes one rail and a part of the other rail of said pair of rails on one surface and has a groove extending from a leading side of the slider to a trailing side thereof on the side of the other rail, and a second slider body bonded to the first slider body so as to cover the groove, which has two holes through the groove while leaving a plate-shaped edge portion and a bridge portion at the trailing side of the slider and the leading side of the slider, respectively, and has one surface aligned with the part of the other rail of the first slider body to form the other rail,
   a head core in an annular shape which has first and second leg portions facing each other, said head core is bonded to a side of the second slider body by aligning the first and second leg portions respectively with the plate-shaped edge portion and the bridge portion, for winding a lead line around the plate-shaped edge portion and the first leg portion, and around the bridge portion and the second leg portion respectively to form a magnetic head core, and a cutaway being formed in the slider and is in communication with the groove such that the cutaway is opened between the one rail and the other rail and at one of a top side and a bottom side of the slider, wherein the lead line is drawn out through the two holes and the groove in a straight condition.

2. The floating type of magnetic head according to claim 1 characterized in that said cutaway is in the form of a substantially rectangular shape in plan view.

3. The floating type of magnetic head according to claim 1 characterized in that said cutaway is formed in such a manner as it becomes narrowed stepwise toward the other side of the first slider body.

4. The floating type of magnetic head according to claim 1 characterized in that said cutaway is in the form of a V-shape in plan view toward the other side of the first slider body.

5. The floating type of magnetic head according to claim 1 characterized in that said cutaway is in the form of a trapezoidal shape in plan view toward the other side of the first slider body.

6. The floating type of magnetic head according to claim 1, characterized in that an additional cutaway adjacent to said cutaway is formed either at the side of the first or the second rail at one side of the first slider body.

* * * * *